Patented July 14, 1925.

1,546,290

UNITED STATES PATENT OFFICE.

CLIFFORD W. HUMPHREY, OF BURLINGAME, CALIFORNIA, ASSIGNOR OF ONE-HALF TO HENRY I. LEA, OF SANTA MONICA, CALIFORNIA.

ALUMINUM CHLORIDE PROCESS.

No Drawing. Application filed June 30, 1923. Serial No. 648,807.

*To all whom it may concern:*

Be it known that I, CLIFFORD W. HUMPHREY, a citizen of the United States, residing at Burlingame, in the county of San Mateo and State of California, have invented new and useful Improvements in Aluminum Chloride Processes, of which the following is a detailed specification.

This invention relates primarily to the production of aluminum chloride from alumina or an alumina bearing ore. The objects of the invention will be best explained and understood from the following detailed description; but it may be stated at the outset that one of the major accomplishments of the invention is a very material reduction in plant cost and operating expenses.

While this application deals primarily with a process whose end is the production of aluminum chloride; the process also intermediately produces alumina, hydrochloric acid and an alkali-metal sulphate. The process with a primary end of producing hydrochloric acid and a sulphate is made the subject matter of a co-pending application filed on July 2, 1923, Serial No. 649,165, entitled "Process of producing hydrochloric acid, an oxide and a sulphate." Such process may start with any metallic oxide, or any ore carrying a metallic oxide, consisting in whole or in part of an oxide or sulphate or in part of both, of a metal whose sulphate is capable of decomposition by heat; whereas the present process for production of aluminum chloride starts with an aluminum compound.

Briefly stated, the steps of the complete process as carried out practically may be described as follows:—

1. Digesting any alumina bearing ore with sulphuric acid and decanting off or filtering the resulting acid sulphate to separate the sulphate from any impurities in the ore, such for instance as $SiO_2$;

2. Then, preferably mixing it with an alkali-metal chloride, such as potassium or sodium chloride, and subjecting the mixture to heat in the presence of water (preferably steam); thus forming hydrochloric acid, alumina and an alkali-metal sulphate;

3. The hydrochloric acid produced is then used to chlorinate the aluminum oxide and this is usually done in two steps, the third step being the decomposition of the hydrochloric acid to produce chlorine and the fourth step being the chlorination of the oxide in the presence of carbon to form aluminum chloride. Typical chemical reactions for the process are as follows:

I. $Al_2O_3 + 4H_2SO_4 = Al_2(SO_4)_3 \cdot H_2SO_4 \cdot 3H_2O$
II. $Al_2(SO_4)_3 \cdot H_2SO_4 \cdot 3H_2O + 8KCl + Heat + Steam = Al_2O_3 + 8HCl + 4K_2SO_4$
III. $8HCl + Air + Catalyzer = 8Cl + 4H_2O + N$
IV. $Al_2O_3 + 6Cl + 3C + Heat = Al_2Cl_6 + 3CO$ In the first step the acid sulphate is produced in hydrated form and is preferably dried to get rid of excess water before being treated with the alkali-metal chloride. The acid sulphate may be evaporated down to crystal and then mixed with the dry chloride; or the chloride may be mixed with the acid sulphate while still liquid, or the chloride dissolved in water or in the diluted acid sulphate itself to form a more intimate mixture, and then the mixture dried to a suitable consistency to be handled in a calcining furnace.

The second step is carried on in a calcining furnace or salt cake pan or similar form of apparatus in the presence of steam and at a temperature sufficient to cause practically complete chemical reaction between the chlorides and sulphur trioxide. The reaction starts at a comparatively low temperature and proceeds as the temperature is increased; and although the reaction does not go to theoretic full completion, a final temperature of 700° or 800° C., I find sufficient to convert practically all the chloride to sulphate. (Of this feature I speak more in detail later.) The gaseous HCl and excess water vapors pass off, leaving a mixture of aluminum oxide and alkali-metal sulphates that may be separated by leaching.

In the reaction (II), although the acid sulphate contains all the H theoretically needed for formation of the HCl; in practice the calcining temperature is such as to drive off the contained moisture before the chemical reactions are complete. Therefore extra H is supplied as needed in the form of steam.

In the third step the hydrochloric acid after thorough drying is easily decomposed into chlorine and water by passing it through a catalyzer in the presence of air; and then the Cl washed to remove unconverted HCl and then dried.

In the fourth step the chlorination of the aluminum oxide is effected by subjecting the aluminum oxide to the chlorine in the presence of carbon at a temperature of (approximately 600° or more. I find 1000° C. is a good temperature for efficient action.)

Any alumina bearing ore may be the starting point of this process; the sulphuric acid acting upon the alumina contained in the ore to form the acid aluminum sulphate; and the formed sulphate being separated from whatever residue there may be. Principal or typical ores which may be used are:

Alunite $K_2O3Al_2O_34SO_36H_2O$
Alunogen $Al_2O_33SO_318H_2O$
Bauxite $Al_2O_32H_2O$
Aluminite $Al_2O_3SO_39H_2O$
Clay $Al_2O_32SiO_22H_2O$ (typical).

It will be seen that these ores contain varying amounts of $SO_3$; and as more $SO_3$ is contained in the ore, less sulphuric acid need be added to obtain the acid sulphate. On the other hand sulphuric acid may be added in even larger quantities up to a proportion of $6H_2SO_4$.

In the example given above by equation it will be noted that 8HCl is obtained in the second step and 8Cl is obtained in the third; whereas theoretically, only 6Cl is needed for chlorinating the alumina produced in the second reaction. This excess of chlorine is very desirable to take care of inefficiency and losses in commercial operations. In other processes it is often necessary to supply deficiencies of chlorine or hydrochloric acid from some external source. In this connection I may state that, by varying the $SO_3$ content in the second step, I may produce any desired proportionate amount of hydrochloric acid up to 12HCl, or 100% excess over that required to chlorinate the alumina produced in the second reaction. Likewise, I may make the $SO_3$ content sufficiently in excess of the KCl content to produce a very high grade of potassium sulphate. This is a very desirable feature in itself as the potassium sulphate is a valuable by-product of the process. Sodium sulphate may of course likewise be produced in the process by using NaCl in place of KCl.

The variation of the $SO_3$ content in the acid sulphate of the second step is taken care of when forming the sulphate, and the result is really a mixture of aluminum sulphate and acid aluminum sulphate. Aluminum sulphate has a formula $Al_2O_33SO_318H_2O$ sometimes written $Al_2(SO_4)_318H_2O$. The acid sulphates are represented by $Al_2O_33SO_3H_2SO_43H_2O$ and $Al_2O_33SO_33H_2SO_47H_2O$ depending on the amount of $SO_3$ contained. The limits are $3SO_3$ in the normal sulphate and $6SO_3$ in the maximum acid sulphate. I therefore have a range of anything from $3SO_3$ to $6SO_3$.

In forming HCl we have the formula: (considering now only the $SO_3$ content of the sulphate)

$$SO_3+2KCl+H_2O=K_2SO_4+2HCl$$

So for every molecule of $SO_3$ I can make one molecule of $K_2SO_4$ and 2 of HCl. I can therefore vary the HCl production from 6HCl to 12HCl depending on whether I use normal aluminum sulphate or acid sulphate. If I use, say, $5SO_3$ and 8KCl in the calcining mixture (Equation II) the reaction would be as follows:

$$5SO_3+5H_2O+8KCl= 4K_2SO_4+8HCl+SO_3+H_2O;$$

giving an excess of $SO_3$ which probably breaks down to $SO_2$ plus O.

These reactions are never theoretically complete, so if there is an excess of $SO_3$ present we are more likely to get a greater portion of KCl converted to $K_2SO_4$. This is desirable because for some commercial uses it is specified that the potassium sulphate shall not contain over 1½% of KCl.

In some instances, at least, both the reactions (I and II) may be carried out in one operation. Thus the requisite $H_2SO_4$ may be added to the ore and then the chloride mixed in; and then the mixture is treated in a salt cake pan or similar apparatus, to the temperatures stated, in the presence of steam. The result is the production of alumina, HCl and the alkali-metal sulphate. The HCl separates itself, as before stated, the sulphate may be leached out, and the alumina must be separated from the gangue. Thus, broadly speaking, the process involves treating an ore with sulphuric acid and an alkali-metal chloride, whether in one or two physical operations.

Although the primary commercial end of the process as described herein is the production of aluminum chloride, it will be noted that aluminum oxide is a direct intermediate product of the process. The production of aluminum oxide is in many instances desirable in itself; and it is sometimes desirable to produce aluminum oxide for the purpose of producing, by chlorination, aluminum chloride at other times or places and in other chemical processes. And consequently, we do not wish to have our invention specifically limited to the direct or immediate production of aluminum chloride but wish it to be understood that the invention also includes the production of aluminum oxide as an immediate end.

Having described a preferred form of my invention, I claim:

1. The process that includes treating alumina bearing ore with sulphuric acid to form an acid sulphate, treating the acid sulphate with an alkali-metal chloride, water and heat to form alumina and hydrochloric acid, then chlorinating the alumina with chlorine from the hydrochloric acid.

2. The process that includes treating alumina bearing ore with sulphuric acid to form an acid sulphate, treating the acid sulphate with an alkali-metal chloride, water and heat to form alumina, and hydrochloric acid and an alkali sulphate, separating the sulphate from the alumina, then chlorinating the alumina with chlorine from the hydrochloric acid.

3. The process that includes treating alumina bearing ore with sulphuric acid to form an acid sulphate, treating the acid sulphate with an alkali-metal chloride, water and heat to form alumina and hydrochloric acid, then decomposing the hydrochloric acid into water and chlorine, and chlorinating the alumina with the chlorine in the presence of carbon.

4. The process that includes treating an alumina bearing ore with sulphuric acid to form an acid sulphate, separating the sulphate from the residue, drying it and treating it with an alkali-metal chloride, water and heat to form alumina and hydrochloric acid, then chlorinating the alumina with chlorine from the hydrochloric acid.

5. The process that includes treating an aluminum sulphate with an alkali-metal chloride, water and heat to form alumina and hydrochloric acid, then chlorinating the alumina.

6. The process that includes treating an aluminum sulphate with an alkali-metal chloride, water and heat to form alumina chloride, and hydrochloric acid, decomposing the HCl to form chlorine, and chlorinating the alumina with the Cl.

In witness that I claim the foregoing I have hereunto subscribed my name this 21st day of June 1923.

CLIFFORD W. HUMPHREY.

Witnesses:
J. W. EGAN,
A. G. GRASSO.